Figure 1:
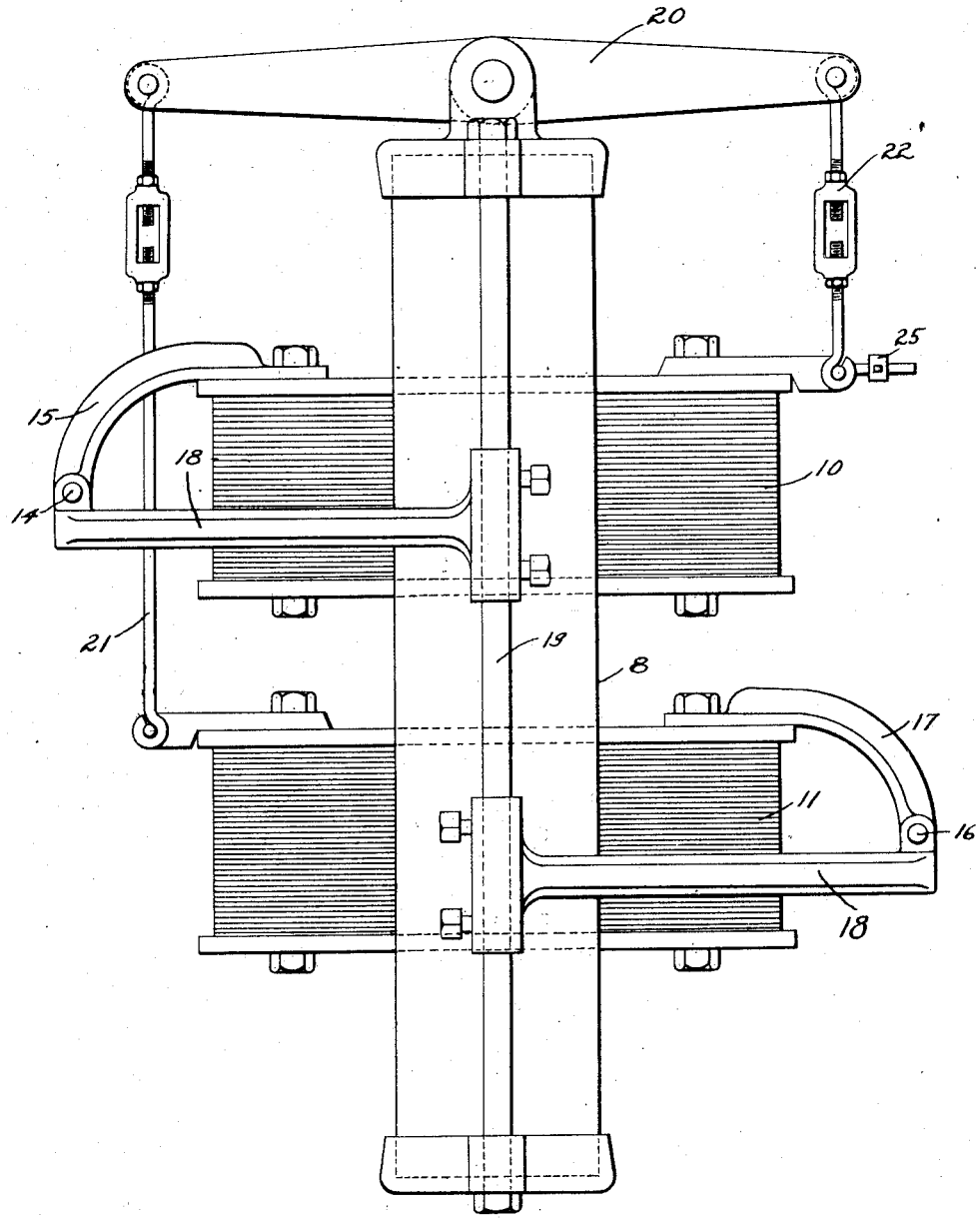

Oct. 2, 1923.

W. E. DOUGLASS 1,469,213

CONSTANT CURRENT TRANSFORMER

Filed July 12, 1917    2 Sheets-Sheet 1

WITNESSES:
J. R. Krear
D. C. Davis

INVENTOR
William E. Douglass
BY
Wesley G. Carr
ATTORNEY

Oct. 2, 1923. 1,469,213
W. E. DOUGLASS
CONSTANT CURRENT TRANSFORMER
Filed July 12, 1917 2 Sheets-Sheet 2
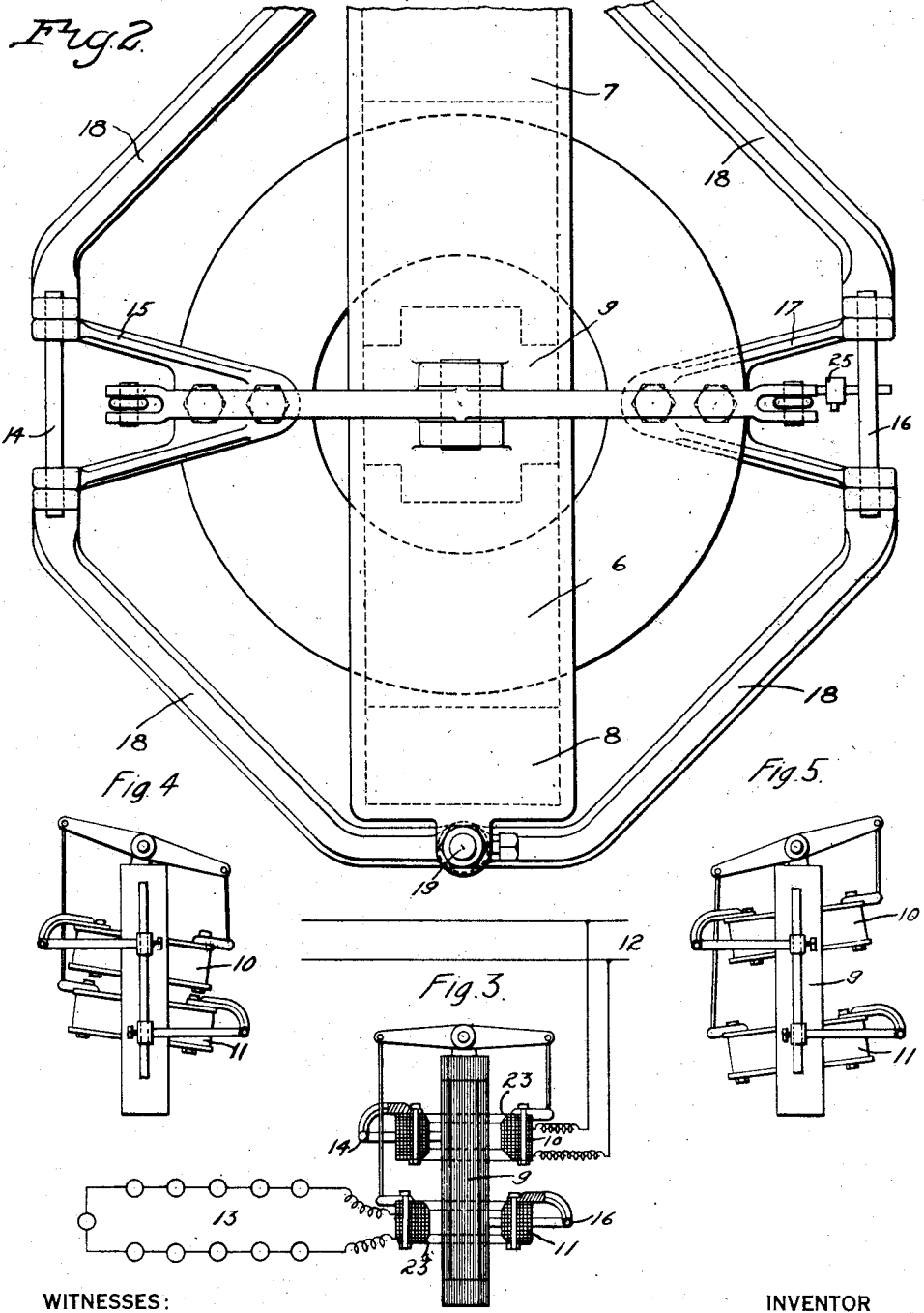
WITNESSES:
T. R. Krear
D. C. Davis
INVENTOR
William E. Douglass
BY
ATTORNEY Patented Oct. 2, 1923.

1,469,213

UNITED STATES PATENT OFFICE.

WILLIAM E. DOUGLASS, OF WILKINSBURG, PENNSYLVANIA, ASSIGNOR TO WESTINGHOUSE ELECTRIC AND MANUFACTURING COMPANY, A CORPORATION OF PENNSYLVANIA.

CONSTANT-CURRENT TRANSFORMER.

Application filed July 12, 1917. Serial No. 180,076.

*To all whom it may concern:*

Be it known that I, WILLIAM E. DOUGLASS, a citizen of the United States, and a resident of Wilkinsburg, in the county of Allegheny and State of Pennsylvania, have invented a new and useful Improvement in Constant-Current Transformers, of which the following is a specification.

My invention relates to transformers or regulators of the constant-current or moving coil type, and it has for its object to provide a structure of the character designated wherein the moving parts shall move with a minimum of friction and liability to sticking, said apparatus further being susceptible of design and adjustment so as to give very close regulation over a wide range of load variation.

In the accompanying drawing, Fig. 1 is a side view, in elevation, of a transformer embodying my invention; Fig. 2 is a top plan view of the apparatus shown in Fig. 1; Fig. 3 is a partial sectional view of the apparatus shown in Figs. 1 and 2 indicating the circuit connections thereof; and Figs. 4 and 5 are simplified diagrammatic views of the apparatus shown in Figs. 1 and 2, indicating the relationship of the moving members thereof under light and heavy load conditions, respectively.

Transformers of the moving coil type are well known wherein the primary and secondary windings are repelled from each other under light load conditions and approach each other under heavy load conditions.

Said devices, as usually built in the past, have comprised relatively movable coils surrounding a vertically disposed core member, one or more of said coils being suitably suspended and counter-weighted so as to slide freely up and down on said core member. This construction, while giving excellent results in a station where the core member may be accurately adjusted to the vertical position and where there is constant inspection and maintenance, is not well adapted for mounting on the pole, particularly in remote regions where inspection and maintenance is comparatively poor. When mounted under these conditions, apparatus of the usual type is rarely, if ever, so mounted that the core member is strictly vertical and, consequently, the moving coils rub thereagainst, seriously interfering with their free movement and the resultant accurate regulation of the secondary current.

In accordance with my invention, I dispose the primary and secondary windings around a core member in the form of coils having a large clearance with respect to said core member. One of said coils is pivoted about a horizontal axis on one side of the core member and the other about a similar axis on the other side of said core member and the free edges of said coils opposite said pivots are then connected by a suitable linkage, whereby said coils serve to counterweight each other. Under light load conditions, said coils repel each other and swing far apart, whereas, under heavy load conditions, they swing close together and reduce the magnetic leakage to a minimum. The adjustment is such that all friction is localized at the joints, whereby it may be maintained at a substantially constant figure, the coils at all times being restrained from rubbing against the core member and thus introducing a variable factor into the regulation.

Referring to the drawing for a more detailed understanding of my invention, a core member of the usual rectangular type is shown in top, edge view at 6 in Fig. 2. Said core member is provided with the usual side members indicated at 7 and 8 and with a central transverse leg member indicated at 9. Primary and secondary windings, in the form of coils 10 and 11, loosely surround the central core member 9, the winding 10 being connected to primary supply leads 12 and the winding 11 being connected to a load circuit 13, as indicated in Fig. 3.

The coil 10 is pivoted about a horizontal axis 14 by means of a bracket member 15 and the coil 10 is similarly pivoted about a horizontal axis 16 by means of a bracket member 17. The axis 14 and 16 are carried by bracket members 18—18 which may be clamped at any desired height by reason of sliding and clamping engagement with a rod 19 at one side of the transformer core and with a similar rod (not shown) at the other side of the core.

A lever member 20 is centrally pivoted at the top of the transformer core and is connected at one end to the free edge of the coil 11, as by an adjustable link 21, and is similarly connected at the other end to the free edge of the coil 10, as by an adjustable link 22. The relative balance of the two coils may be adjusted, as by a sliding weight 25.

Having thus described the arrangement of a device embodying my invention, the operation thereof is as follows: Under no-load conditions, the coils 10 and 11 are biased to closely approach each other, under the influence of gravity, as indicated in Fig. 4, this result being obtained by causing the weight of the coil 10 to slightly preponderate over the weight of the coil 11. Under heavy-load conditions, the series load circuit having high resistance tends to have small current and the mutual repulsion between the coils 10 and 11 is relatively small, causing said coils to maintain substantially the positions shown in Fig. 4. As the load is decreased by cutting out series-connected elements, the secondary current tends to increase, increasing the repellant action between the two coils, causing them to separate, as indicated in Fig. 5, until the magnetic leakage restores the current to the desired value.

By causing the coils 10 and 11 to surround the central core member 9 with considerable clearance, as indicated, said coils may be tilted through a considerable angle without touching said core member and this effect may be still further increased by bevelling the inner corners of said cores in any suitable manner, as indicated at 23 in Fig. 3.

If it be desired to adjust the transformer for operation at slightly different secondary currents, the bracket members 18—18 may be suitably moved toward or away from each other for a short distance, the links 21 and 22 being simultaneously adjusted to maintain the desired substantially-parallel relationship between the two coils. Furthermore, the weight 25 may be adjusted.

While I have shown my invention in its preferred form, it will be obvious to those skilled in the art that it is susceptible of various minor changes and modifications without departing from the spirit thereof and I desire, therefore, that only such limitations shall be placed thereupon as are imposed by the prior art or as are specifically set forth in the appended claims.

I claim as my invention:

1. In a constant current transformer, the combination with a core member having a leg portion, of two flat coils loosely surrounding said leg portion, said coils being pivotally mounted for rotation about parallel axes disposed on opposite sides of said core member, said axes being perpendicular to a plane passing through the longitudinal axis of said core member, and means for adjusting said axes in a direction parallel to the longitudinal axis of said leg member.

2. In a constant-current transformer, the combination with a core member having a leg portion, of two flat coils loosely surrounding said leg portion, said coils being pivotally mounted for rotation about parallel axes disposed on opposite sides of said core member, said axes being perpendicular to a plane passing through the longitudinal axis of said core member, a linkage interconnecting said coils, whereby their planes are at all times maintained substantially parallel, and means for adjusting said axes in a direction parallel to the longitudinal axes of said leg member.

3. In a constant-current transformer, the combination with a core member provided with a vertically disposed leg member, of two flat coils loosely encircling said leg member and mounted for movement about parallel horizontal axes disposed on opposite sides of said leg member, whereby said coils may move relatively to each other, and means for adjusting the height of said horizontal axes.

4. In a constant-current transformer, the combination with a core member provided with a vertically disposed leg member, of two flat coils loosely encircling said leg member and mounted for movement about parallel horizontal axes disposed on opposite sides of said leg member, whereby said coils may move relatively to each other, a linkage interconnecting said coils, whereby their planes are at all times maintained substantially parallel, and means for adjusting the height of said horizontal axes and for adjusting said linkage, whereby the planes of said coils are at all times maintained substantially parallel but the distance therebetween in the different positions may be adjusted.

5. A constant-current transformer comprising a core member provided with a vertically disposed leg member, vertically disposed rods mounted adjacent to said core member, sliding clamps on said rods carrying independently adjustable horizontally disposed axial members on opposite sides of said leg member, primary and secondary windings in the form of flat coils loosely embracing said leg member and respectively pivoted on said axial members, and a linkage inter-connecting the free edges of said coils, whereby they are constrained to move toward and away from each other under the influence of forces developed therebetween without engaging said leg member.

6. A constant-current transformer comprising a core member provided with a vertically disposed leg member, vertically disposed rods mounted adjacent to said core member, sliding clamps on said rods carrying independently adjustable horizontally disposed axial members on opposite sides of said leg member, primary and secondary windings in the forms of flat coils loosely embracing said leg member and respectively pivoted on said axial members, a centrally pivoted lever, and links connecting the free edges of said coils with the respective ends of said lever, whereby the weights of said coils are substantially balanced.

7. A constant-current transformer comprising a core member provided with a vertically disposed leg member, vertically disposed rods mounted adjacent to said core member, sliding clamps on said rods carrying independently adjustable horizontally disposed axial members on opposite sides of said leg member, primary and secondary windings in the forms of flat coils loosely embracing said leg member and respectively pivoted on said axial members, a centrally pivoted lever, and links connecting the free edges of said coils with the respective ends of said lever, whereby the weights of said coils are substantially balanced, said coils being normally biased toward each other by gravity but repelling each other in accordance with currents flowing therethrough.

In testimony whereof, I have hereunto subscribed my name this 29th day of June 1917.

WILLIAM E. DOUGLASS.